(12) United States Patent
Tohyama

(10) Patent No.: US 7,359,632 B2
(45) Date of Patent: Apr. 15, 2008

(54) FLASH APPARATUS, IMAGE CAPTURE APPARATUS HAVING A FLASH APPARATUS, AND METHOD OF CONTROLLING A FLASH APPARATUS

(75) Inventor: Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 11/191,661

(22) Filed: Jul. 27, 2005

(65) Prior Publication Data
US 2006/0039689 A1 Feb. 23, 2006

(30) Foreign Application Priority Data
Aug. 18, 2004 (JP) .............................. 2004-238817

(51) Int. Cl.
*G03B 15/03* (2006.01)
(52) U.S. Cl. ....................... 396/155; 396/159; 396/160; 396/161; 396/162; 396/163; 396/164; 396/205; 396/206; 348/370; 348/371; 315/241 P
(58) Field of Classification Search ..................... None
See application file for complete search history.

(56) References Cited

U.S. PATENT DOCUMENTS

| | | | |
|---|---|---|---|
| 3,679,991 A * | 7/1972 | Wilwerding | 331/62 |
| 5,168,300 A * | 12/1992 | Yasukawa | 396/157 |
| 5,705,808 A * | 1/1998 | Filo | 250/214 P |
| 6,314,243 B1 * | 11/2001 | Ishiguro | 396/155 |
| 6,535,692 B2 * | 3/2003 | Nakanishi et al. | 396/159 |
| 6,556,132 B1 * | 4/2003 | Pattok et al. | 340/331 |
| 2004/0057716 A1 * | 3/2004 | Lee et al. | 396/155 |

FOREIGN PATENT DOCUMENTS

| | | |
|---|---|---|
| JP | 10-170994 A | 6/1998 |
| JP | 2001-228511 A | 8/2001 |
| JP | 2001-242510 A | 9/2001 |

* cited by examiner

*Primary Examiner*—W. B. Perkey
*Assistant Examiner*—Warren K Fenwick
(74) *Attorney, Agent, or Firm*—Canon U.S.A. Inc., I.P. Division

(57) ABSTRACT

A flash apparatus or an image capture apparatus includes a charging unit, configured to boost a voltage of an electric source and a control unit, configured to calculate the sum of the light emission amount within a predetermined period of time. The control unit reduces the temperature rise of components which generate heat due to the continuous light emission when the sum of the light emission amount reaches a predetermined value.

24 Claims, 13 Drawing Sheets

FIG.11

| LIGHT EMISSION AMOUNT | SET TIME (μs) |
|---|---|
| 1/1 | 2000 |
| 1/2 | 600 |
| 1/4 | 300 |
| 1/8 | 150 |
| 1/16 | 80 |
| 1/32 | 40 |
| 1/64 | 20 |
| 1/128 | 10 |

FLASH APPARATUS, IMAGE CAPTURE APPARATUS HAVING A FLASH APPARATUS, AND METHOD OF CONTROLLING A FLASH APPARATUS

BACKGROUND OF THE INVENTION

1. Field of the Invention

The present invention relates to a flash apparatus, and a camera having a flash apparatus.

2. Description of the Related Art

There have been various proposals relating to techniques for reducing the temperature rise of a light emission section and a charging circuit, attributed to continuous light emission of a flash apparatus.

For example, Japanese Patent Application Laid-Open (JP-A) No. 2001-228511 discusses a construction configured to operate a light emission preventing section (which reduces light emission), during a continuous and full light emission mode, in order to cope with an associated temperature rise. The construction also prohibits the light emission preventing section from operating during a light amount control mode.

Also, JP-A No. 2001-242510 discusses a construction configured to count the number of times of light emission within a predetermined period of time and limiting charging operations based on the counting results.

Further, JP-A No. 10-170994 discusses a construction configured to actually detect the temperature inside a flash apparatus so as to limit the temperature rise.

However, the construction disclosed in the JP-A No. 2001-228511 can only roughly reduce the temperature rise, because, even in the case where the amount of light emission is controlled, the temperature may rise to a great extent, or conversely, if the light emission is reduced to a certain level, the prevention of the light emission may not be required.

In JP-A No. 2001-242510, the number of times of light emission is counted, and it assumes that there is full light emission. While the light emission amount varies in accordance with light amount control, a change of a calorific value due to a light emission is not considered in the light amount control and only roughly is a temperature rise detected. Conventionally, a light amount controlling system is mainstream in the flash apparatus market and a digital camera can be used in continuous shooting more often than a film camera due to its low running cost. Therefore, the digital camera is required to continuously shoot images while reducing an operational temperature rise. An increased efficiency of operation would be facilitated by finer control and reduction of associated operational temperature rises.

Further, in JP-A No. 10-170994, a detecting section for detecting the temperature inside the flash apparatus is included in the described device, which could give rise to increased manufacturing costs and detecting section arrangement issues.

SUMMARY OF THE INVENTION

At least one exemplary embodiment is directed to a flash apparatus, and/or an image capture apparatus having a flash apparatus which can be configured to reduce the temperature rise, and reduce the instances where the temperature rise reduction function operates unnecessarily.

In at least one exemplary embodiment, a flash apparatus, or an image capture apparatus having the flash apparatus, includes a charging unit configured to boost a voltage of an electric source in order to charge a capacitor for supplying a light emission energy to a discharge tube. Additionally included is a light emission amount obtaining unit configured to obtain a light emission amount, and which monitors the factors in the temperature rise by calculating the sum of the light emission amount within a predetermined period of time, which can be based on an output of the light emission amount obtaining unit.

Another exemplary embodiment is directed to a flash apparatus, or an image capture apparatus having the flash apparatus, which includes a charging unit configured to boost a voltage of an electric source in order to charge a capacitor for supplying a light emission energy to a discharge tube. Additionally included is a light emission amount obtaining unit configured to obtain a light emission amount, and which monitors the factors in the temperature rise by calculating the number of times a light emission, of a predetermined light emission amount or more, occurs within a predetermined period of time, based on an output of the light emission amount obtaining unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

FIG. 11 illustrates a view showing the relationship between a light emission amount and set time in the flash apparatus according to the third exemplary embodiment.

DETAILED DESCRIPTION OF THE EMBODIMENTS

The following description of at least one exemplary embodiment is merely illustrative in nature and is in no way intended to limit the invention, its application, or uses. Processes, techniques, apparatus, and materials as known by one of ordinary skill in the relevant art may not be discussed in detail but are intended to be part of the enabling description where appropriate. For example lens, lens driving units, encoders, digital signal processing units are discussed and any material that can be used to form these elements, and the various designs of these elements should fall within the scope of exemplary embodiments (e.g., glass, Si). Additionally the actual size of the elements of exemplary embodiments may not be discussed, however any size from macro to nano are intended to lie within the scope of exemplary embodiments (e.g., lenses with diameters of nanometer sizes to meter sizes). Additionally, exemplary embodiments are not limited to visual optical systems, for example the system can be designed for use with infrared and other wavelength systems. Exemplary embodiments will be described in detail below with reference to the drawings.

A First Exemplary Embodiment

Figure 1:
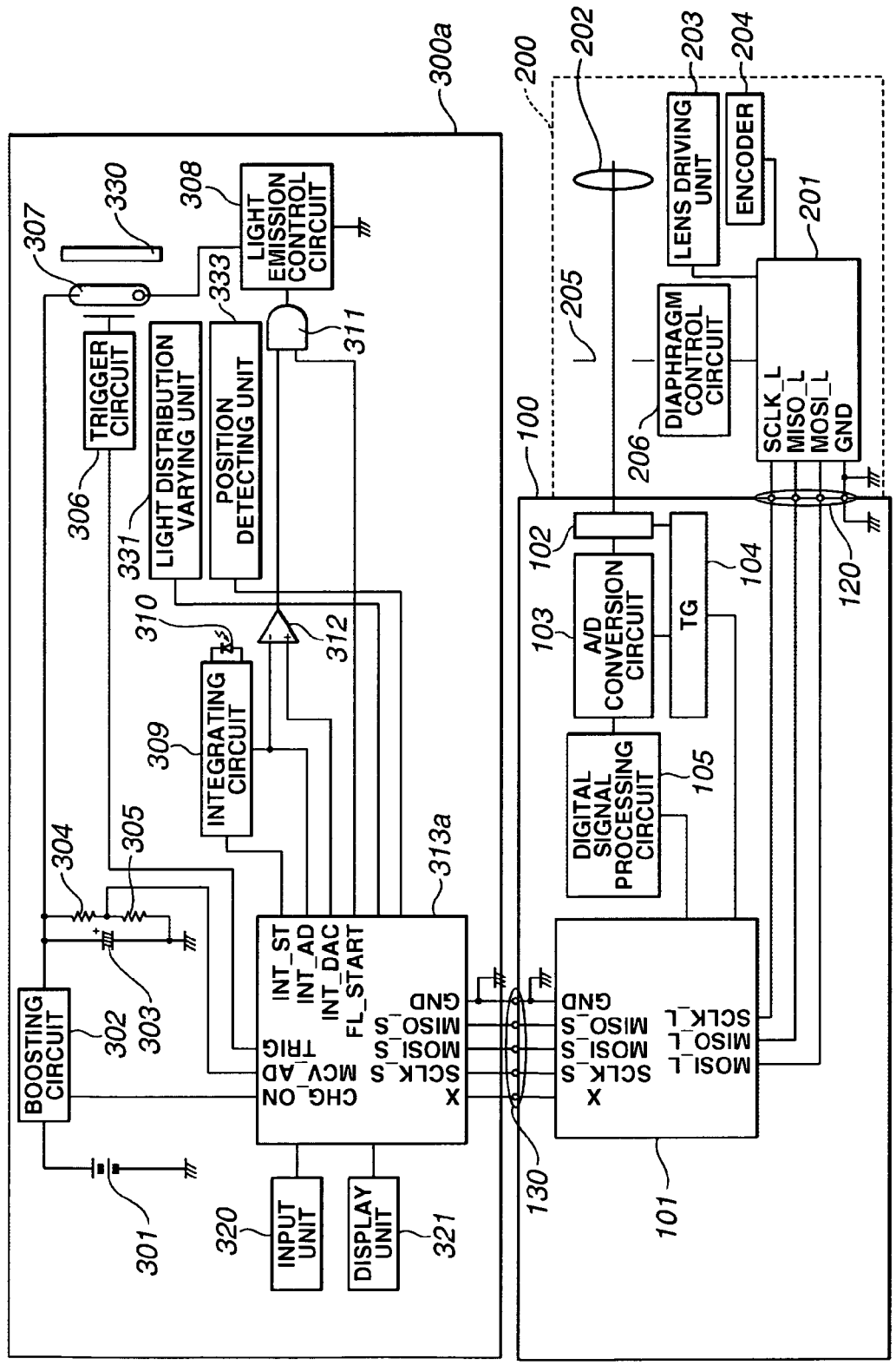
FIG. 1 illustrates a block diagram showing the arrangement of a circuit of a camera system according to a first exemplary embodiment.

FIG. 1 illustrates a block diagram showing the arrangement of a circuit of a camera system according to a first exemplary embodiment. This camera is constructed by a camera main body 100, a lens apparatus 200, and a flash apparatus 300a.

At first, a construction of the camera main body 100 is described below. In this first exemplary embodiment, the camera body to be described is that of a digital camera, although exemplary embodiments are not limited to the type of camera.

In FIG. 1, reference numeral 101 designates a microcomputer (hereinafter referred to as "the camera microcomputer") configured for controlling respective components of the camera main body 100; reference numeral 102 designates an image capture element (e.g., a CCD, a CMOS, other image capturing devices as known by one of ordinary skill in the relevant art, and equivalents), which can include a light filter (e.g., an infrared cut filter) and a low pass filter, onto which an object image is formed and photographed by a lens 202 as described below; reference numeral 103 designates an A/D conversion circuit (hereinafter referred to as "AD")configured for analog-to-digital conversion of a signal of the image capture element 102; reference numeral 104 designates a timing generator (TG) configured for generating a driving timing for the image capture element 102 and the AD conversion circuit 103; and reference numeral 105 designates a digital signal processing circuit configured for subjecting the image data converted into a digital signal by the AD conversion circuit 103 to image processing according to image processing parameters. Circuits as known by one of ordinary skill in the relevant art may not be discussed here but are intended to be part of the enabling disclosure where appropriate (e.g., storage units).

Reference numeral 130 designates an interface with the flash apparatus 300a, which can be constructed by an X terminal configured for outputting a light emission start signal, a GND terminal for earthing, a SCLK_S terminal configured for outputting a communication clock signal to a flash apparatus microcomputer 313a described later, a MOSI_S terminal configured for transmitting data from the camera microcomputer 101 to the flash apparatus microcomputer 313a in synchronization with the SCLK_S terminal, and a MISO_S terminal configured for receiving data from the flash apparatus microcomputer 313a to the camera microcomputer 101 in synchronization with the SCLK_S terminal. Via these terminals communication can be facilitated between the camera microcomputer 101 and the flash apparatus microcomputer 313a.

Reference numeral 120 designates an interface with the lens apparatus 200, which can be constructed by a GND terminal for earthing, a SCLK_L terminal configured for outputting a communication clock signal to the lens microcomputer 201 as described later, a MOSI_L terminal configured for transmitting data from the camera microcomputer 101 to the lens microcomputer 201 in synchronization with the SCLK_L terminal, and a MISO_L terminal configured for receiving data from the lens microcomputer 201 to the camera microcomputer 101 in synchronization with the SCLK_L terminal. This facilitates communication between the camera microcomputer 101 and the lens microcomputer 201.

Next, a construction of the lens apparatus 200 is described.

In FIG. 1, reference numeral 201 designates a lens microcomputer configured for controlling operations of respective components of the lens apparatus; reference numeral 202 designates a lens which can be constructed by a plurality of lens elements; reference numeral 203 designates a lens driving unit configured for moving an optical system for focus-positioning within the lens 202. The lens driving amount can be calculated by the camera microcomputer 101 based on an output from a known automatic focus detecting unit (not shown) in the camera main body 100, and then communicated from the camera microcomputer 101 to the lens microcomputer 201, thereby causing the lens microcomputer 201 to operate the lens driving unit 203 by the communicated lens driving amount. Reference numeral 204 designates an encoder configured for detecting a focus position of the lens 202; reference numeral 205 designates a diaphragm which can be controlled by a diaphragm control circuit 206. The lens 202 may be of a fixed focal length type, or of a variable focal length type.

Next, a construction of the flash apparatus 300a is described below.

Reference numeral 313a designates a flash apparatus microcomputer configured for controlling an operation of respective components of the flash apparatus 300a; reference numeral 301 designates a battery as an electric source; reference numeral 302 designates a boosting circuit for boosting a voltage of the battery 301 (e.g., to several hundred volts) in order to supply a charging energy to a capacitor 303 as described later; reference numeral 303 designates a capacitor which can be charged by the boosting circuit 302. Reference numerals 304 and 305 are resistors for dividing a voltage of the charged capacitor 303. The voltage-dividing point is connected to an AD converting terminal MCV_AD of the flash apparatus microcomputer 313a. Reference numeral 307 designates a discharge tube for converting energy charged at the capacitor 303 to light and then radiating it to an object; reference numeral 306 designates a trigger circuit for applying a voltage (e.g., several kilo volts) to the discharge tube 307 when the discharge tube 307 starts to emit light; and reference numeral 308 designates a light emission control circuit configured for controlling the start and stop of the light emission of the discharge tube 307. The light emission control circuit 308 forms a discharge loop of a high voltage side of the capacitor 303, the discharge tube 307, the light emission control circuit 308, and a low voltage side (GND) of the capacitor 303.

Reference numerals 310, 309 are a sensor (e.g., a photodiode), for receiving light emitted by the discharge tube 307, and an integrating circuit configured for integrating the amount of received light, respectively. An output terminal of the integrating circuit 309 is connected to an inverting input terminal of the comparator 312 and an INT_AD terminal of an AD converter (not shown) within the flash apparatus microcomputer 313a. A non-inverting input terminal of the comparator 312 is connected to an INT_DAC terminal serving as an output terminal of a D/A converter (not shown) within the flash apparatus microcomputer 313a, and an output terminal of the comparator 312 is connected to one input terminal of an AND gate 311. Another input terminal of the AND gate 311 is connected to an FL_START terminal of the flash apparatus microcomputer 313a, and an output terminal of the AND gate 311 is connected to the light emission control circuit 308.

Reference numeral 320 designates various kinds of input units through which a photographer inputs various kinds of information (e.g., a light emission amount of the flash apparatus 300a, and a light emission start instruction); reference numeral 321 designates a display unit for displaying various conditions of the flash apparatus; reference numeral 330 designates a lens (e.g., Fresnel); reference numeral 331 designates a light distribution varying (radiation range changing) unit configured for moving the discharge tube 307, and a reflector (reference numeral 332 in FIG. 2) arranged at the rear of the discharge tube 307; and reference numeral 333 designates a position detecting unit configured for detecting positions of the reflector 332 and the discharge tube 307.

Figure 2:
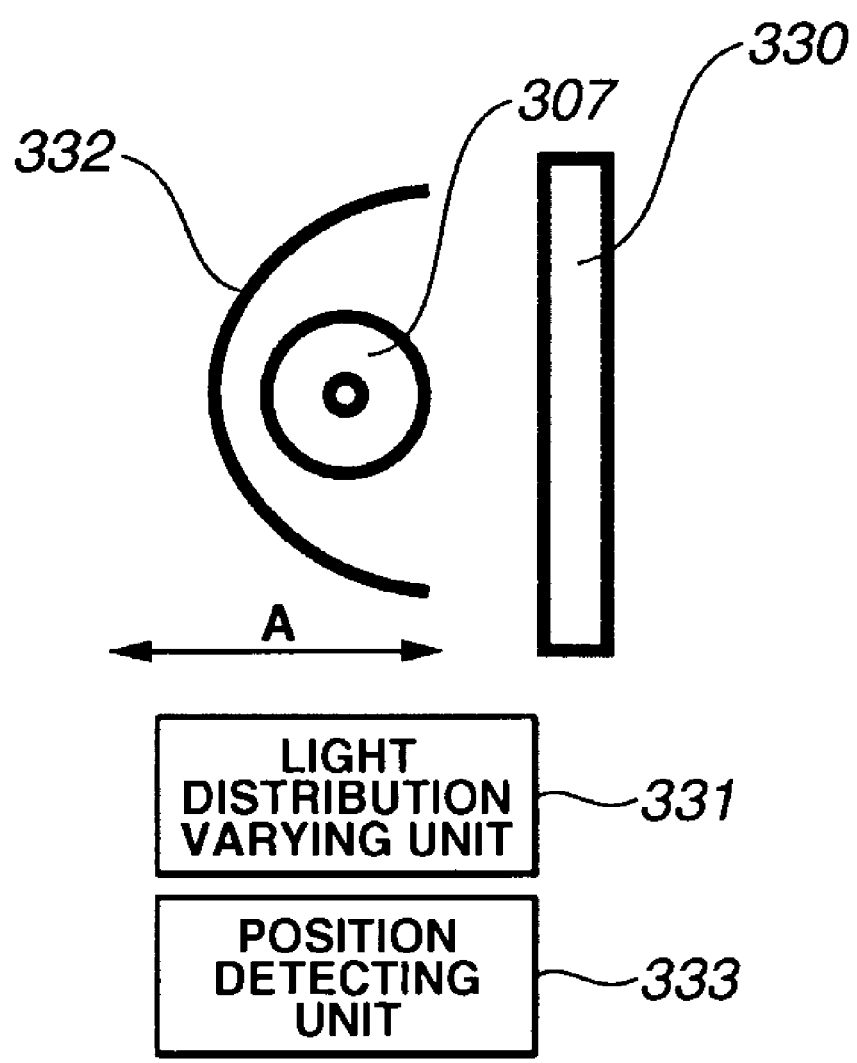
FIG. 2 illustrates a view schematically showing the relationship between a discharge tube and a Fresnel lens in a flash apparatus according to the first exemplary embodiment.

FIG. 2 illustrates a view showing the positional relationship between the reflector 332 and the lens 330. The discharge tube 307 and the reflector 332 can be moved by the light distribution varying unit 331 laterally A in FIG. 2, thereby causing the radiation range of the flash apparatus 300 to change according to the distance (interval) between the discharge tube 307 and the lens 330. The positions of the discharge tube 307 and the reflector 332 can be detected by the position detecting unit 333.

In a case of adapting the light distribution to a wide-angle lens (for example, a lens corresponding to 24 mm-focus distance in a 135film equivalent), the discharge tube 307 and the reflector 332 can be moved closer to the lens 330.

Next, a charging control of the flash apparatus 300a is described with reference to a flowchart illustrated in FIG. 3.

Figure 3:
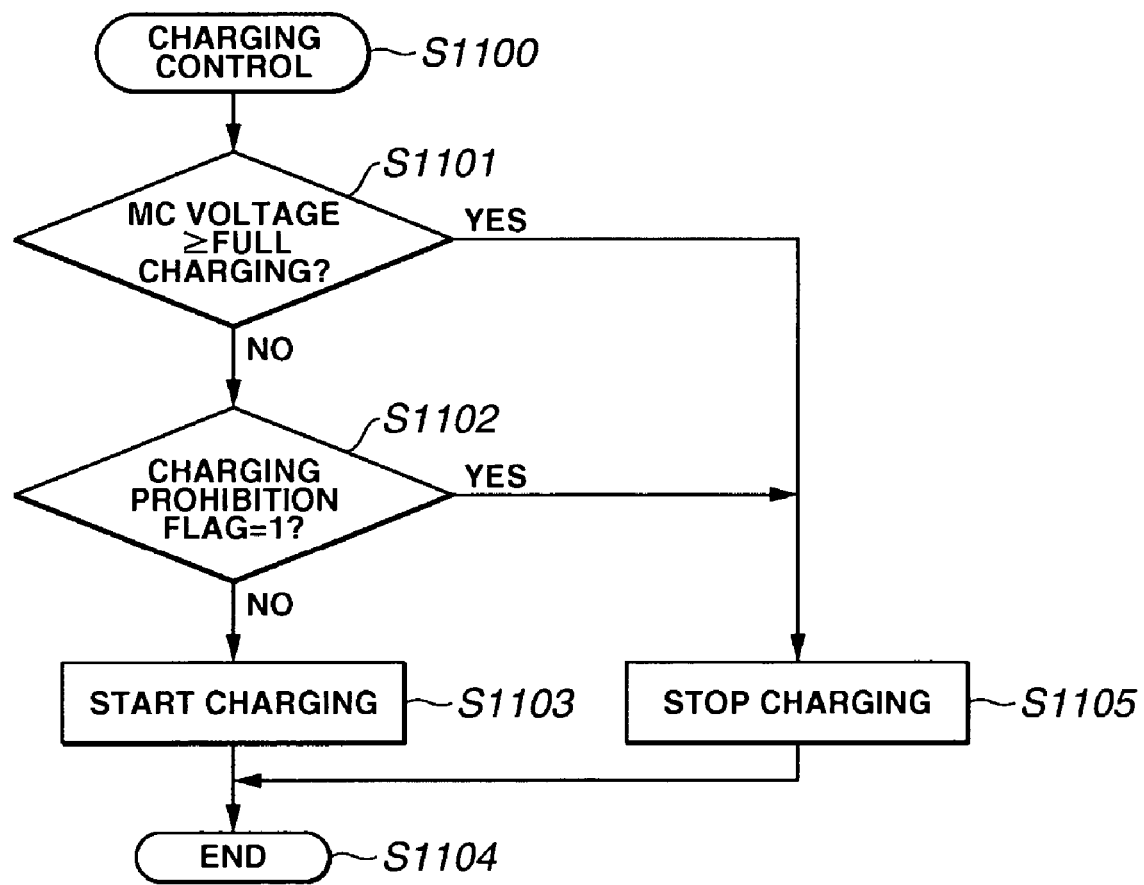
FIG. 3 illustrates a flowchart showing a procedure of a charging control operation executed by the flash apparatus according to the first exemplary embodiment.

In at least one exemplary embodiment, when the main routine periodically calls a subroutine of a charging process until the process enters an electric source off mode or an energy saving mode, the flash apparatus microcomputer 313a can start the charging process (e.g., step S1100 in FIG. 3). First, in step 1101, the flash apparatus microcomputer 313a determines whether an analog-to-digital converted charging voltage of the capacitor 303 through the MCV_AD terminal is greater than or equal to a predetermined full charging voltage value, which is chosen to be high enough for light emission. If so, the program proceeds to step S1105, otherwise to step S1102.

If the program proceeds to step S1102, the flash apparatus microcomputer 313a determines whether a charging prohibition flag, which is described later, is "1." If the flag is "1", the program proceeds to step S1105, otherwise it proceeds to step S1103. If the program proceeds to step S1103, the flash apparatus microcomputer 313a sets the CHG_ON terminal to "H (representing a high level)" to cause the boosting circuit 302 to operate so as to start charging the capacitor 303. In step S1104, the subroutine of the charging process is terminated.

If the program proceeds to step S1105, the flash apparatus microcomputer 313a sets the CHG_ON terminal to "L (representing a low level)" to cause the boosting circuit 302 to stop operating. In step S1104, the subroutine of the charging process is terminated.

In at least one exemplary embodiment, the subroutine of the charging process may be an interruption process executed at regular intervals. The subroutine of the charging process can be called at selected time intervals (e.g., one time per every several ten milliseconds) in order to detect the charging voltage.

Next, a light emitting process of the flash apparatus 300a is described with reference to a flowchart illustrated in FIG. 4.

Figure 4:
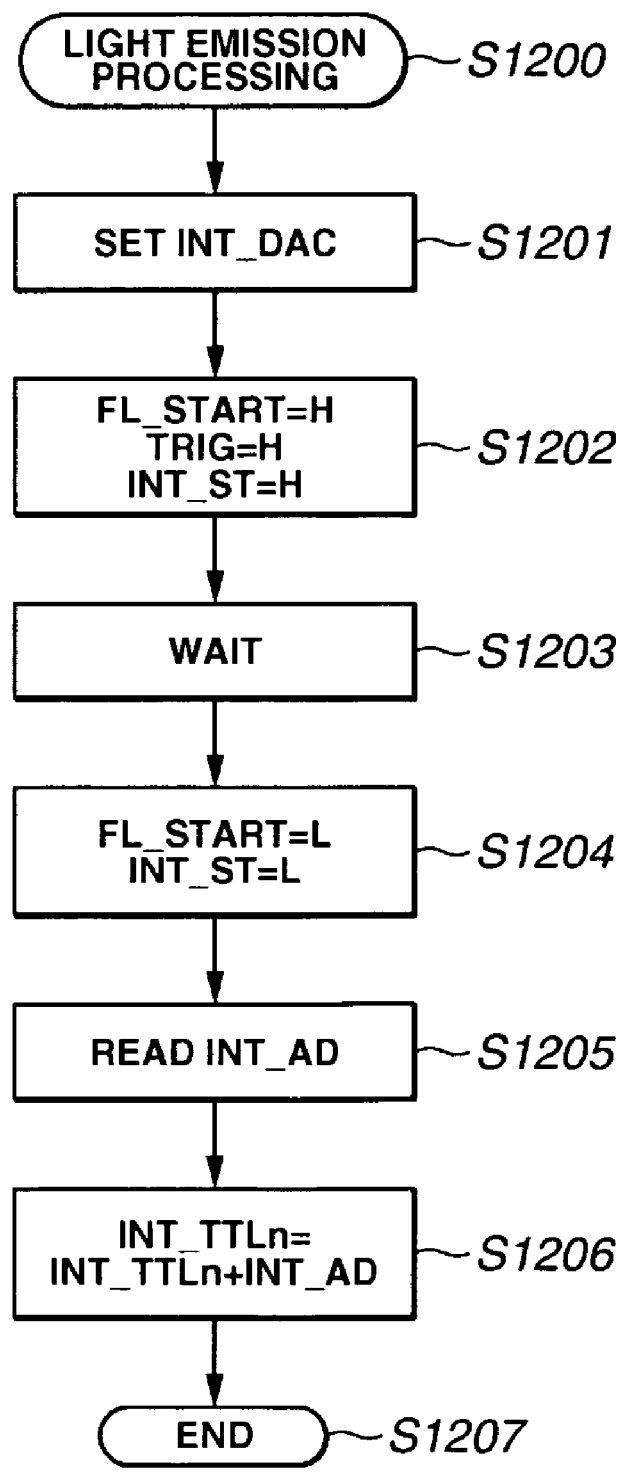
FIG. 4 illustrates a flowchart showing a procedure of a light emitting operation performed by the flash apparatus according to the first exemplary embodiment.

When a light emission start signal for the flash apparatus 300a is inputted to the flash apparatus microcomputer 313a through the X terminal of the interface 130 with the camera main body 100 or the input unit 320, the flash apparatus microcomputer 313a starts a light emission process (e.g., step S1200 in FIG. 4). At first, in step S1201, the flash apparatus microcomputer 313a outputs through the INT_DAC terminal a voltage corresponding to a light emission amount set by communicating with the camera microcomputer 101, or a light emission amount inputted from the input unit 320 of the flash apparatus 300a. In the following step S1202, the flash apparatus microcomputer 313a sets the FL_START terminal to "H" and sets the TRIG terminal to "H" during a predetermined period of time so as to cause the discharge tube 307 to start emitting light. Substantially contemporaneously, the flash apparatus microcomputer 313a sets the INT_ST terminal to "H" so as to cause the integrating circuit 309 to start operating. The integrating circuit 309 integrates an output, which was photoelectrically converted by the sensor 310, and then, when the integrated output becomes larger than a value set by the INT_DAC terminal, an output of the comparator 312 is inverted from "H" to "L." When the signal, inverted from "H" to "L", is inputted to the light emission control circuit 308 through the AND gate 311, the light emission control circuit 308 shuts off the discharge loop and stops discharge.

In step S1203, the flash apparatus microcomputer 313a waits in a ready mode until the light emission is completed. Then, in step S1204, the flash apparatus microcomputer 313a sets the FL_START terminal to "L", and substantially contemporaneously, sets the INT_ST terminal to "L" to cause the integrating circuit 309 to stop operating. In the following step S1205, the flash apparatus microcomputer 313a detects a light emission amount (INT_AD) of the discharge tube 307 by analog-to-digital converting an output of the integrating circuit 309 through the INT_AD terminal. In step S1206, the sum INT_TTLn (n is 0-4 according to a process described later) of a light emission amount in 1/(n+1) of a predetermined period of time is calculated by the following equation (1):

$$INT\_TTLn = INT\_TTLn + INT\_AD \quad (1)$$

Then, the operation proceeds to a step S1207, wherein the light emitting process is terminated.

The value of the light emission amount (e.g., the analog-to-digital converted value) may be employed as it is, or a value may be employed which is stored in a storage section (not shown). The value of the light emission amount can be based on an amount of a light emitted by the flash apparatus, that has been charged, and can be used for light emission. Further, while the light emission amount can be calculated by using a value integrated by the integrating circuit 309 in an exemplary embodiment, it may also be calculated by using a light emission amount set by communicating with the camera microcomputer 101, or a light emission amount inputted from the input unit 320 of the flash apparatus.

Next, an interruption routine, for obtaining the sum of a light emission amount within a predetermined period of time (e.g., a 100 ms interval-interruption process), is described with reference to a flowchart of FIG. 5.

The flash apparatus microcomputer 313a starts an interruption process in a step S1000, and at first, obtains the sum INT_TTL of a light emission amount in a predetermined period of time, by using the following equation (2), in a step S1001:

$$INT\_TTL = INT\_TTL0 + INT\_TTL1 + INT\_TTL2 + INT\_TTL3 + INT\_TTL4 \quad (2)$$

In step S1002, the flash apparatus microcomputer 313a determines whether the sum (INT_TTL) of a light emission amount, within a predetermined period of time, is a predetermined INT_TTL value or more. If it is the predetermined INT_TTL value or more, the program proceeds to a step S1010, otherwise proceeds to a step S1003.

The predetermined INT_TTL value, with respect to the sum of the light emission amount, and the predetermined period of time can be determined based on the relationship among calorific values of the discharge tube 307 itself and the lens 202 (e.g., Fresnel) due to the light emission of the discharge tube 307 (e.g., calorific values of the boosting circuit 302, the battery 301) within the flash apparatus 300a due to the charging, and heat release values of the respective components of the flash apparatus 300a. The predetermined INT_TTL value, with respect to the sum of the light emission amount, and the predetermined period of time are set to such that a member of the flash apparatus 300a does not thermally deform, or the photographer can touch the flash apparatus 300a without suffering permanent injury.

The flash apparatus microcomputer 313a increments a value of a timer T1 for measuring 1/(n+1) of a predetermined period of time in step S1003, and then determines whether the timer T1 counts a chosen T1 amount (e.g., 600 or one minute) or more (e.g., one minute) in step S1004. If the timer T1 counts the chosen T1 amount or more, the program proceeds to a step S1020, otherwise it proceeds to step S1005, where the interruption process is terminated.

If the program proceeds from the step S1004 to step S1020, the flash apparatus microcomputer 313a sets a value of the timer T1 to "0", and then increments n which is used for measuring the predetermined period of time. Then, in step S1021, the flash apparatus microcomputer 313a determines whether or not n is a chosen n-amount (e.g., 5, or five minutes) or more, and, if n is the chosen n-amount or more, the program proceeds to step S1023, otherwise it proceeds to step S1022.

In step S1022, the flash apparatus microcomputer 313a sets the sum INT_TTLn of the light emission amount within 1/(n+1) of the predetermined period of time to "0", followed by the program proceeding to step S1005, where the interruption process is terminated. Further, in the step S1023, the flash apparatus microcomputer 313a sets n to "0", followed by the program proceeding to the above-mentioned step S1022.

A process of steps S1010 to S1015 sets a charging prohibition flag for limiting discharge of the boosting circuit 302 in order to reduce the temperature rise of the respective components of the flash apparatus 300a. The respective components of the flash apparatus 300a can include components which generate heat due to the continuous flash light emission (e.g., the discharge tube 307, the lens 330, the boosting circuit 302, and the battery 301).

In step S1010, the flash apparatus microcomputer 313a determines whether a value of the counter T0 is a chosen T0 amount (e.g., 5) or more, and then, if it is the chosen T0 amount or more, the program proceeds to step S1011, otherwise it proceeds to step S1014. In step S1011, the flash apparatus microcomputer 313a sets the charging prohibition flag to "1", and in step S1014, sets the flag to "0". The flash apparatus microcomputer 313a increments the counter T0(T0=T0+1) in step S1012, and then determines whether a value of the counter T0 is a second chosen T0 amount (e.g., 10 or one second) or more in step S1013. If the value is the second chosen T0 amount or more, the program proceeds to step S1015, otherwise it proceeds to step S1003. In step S1015, the flash apparatus microcomputer 313a sets the counter T0 to "0."

Figure 5:
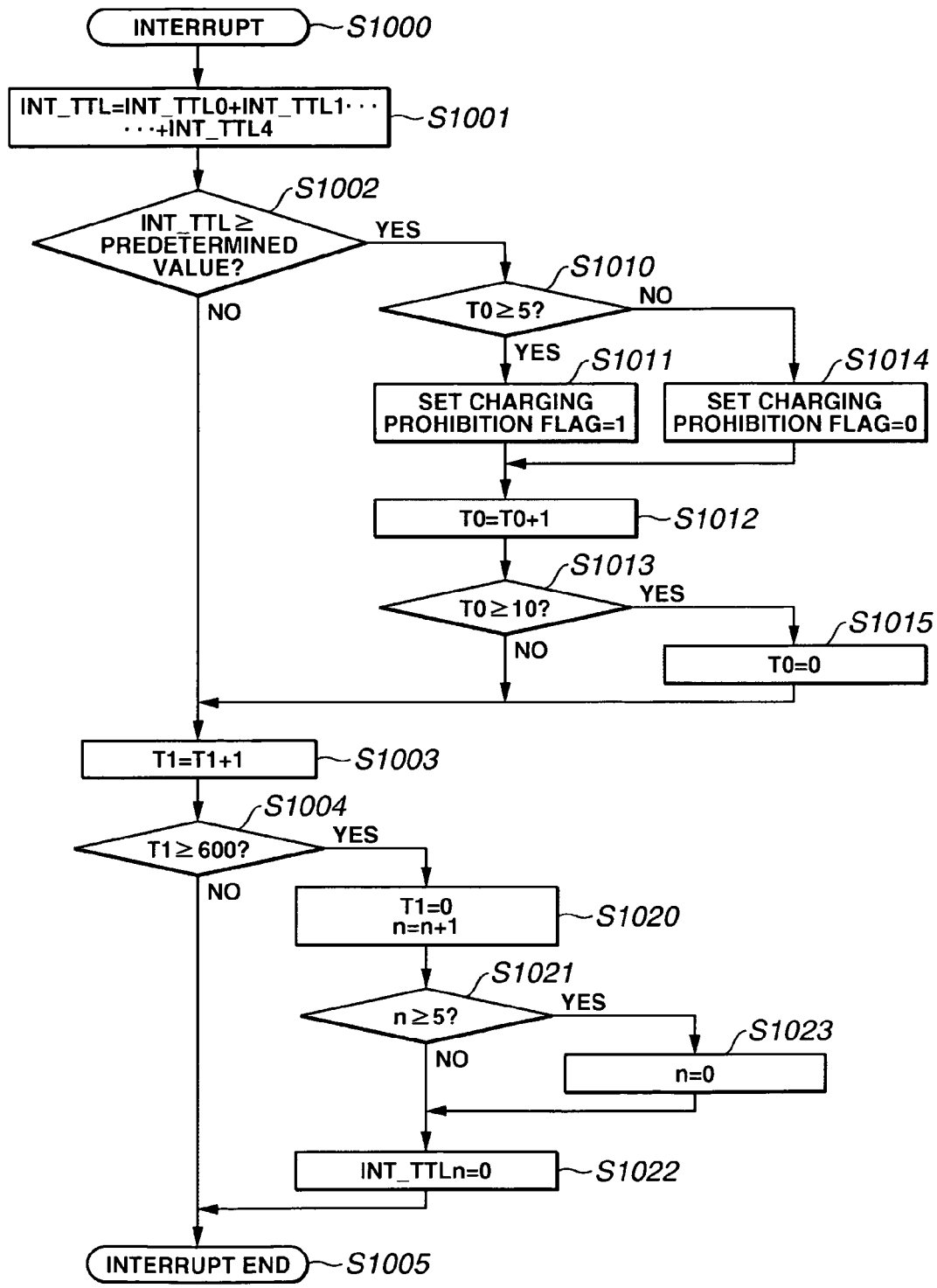
FIG. 5 illustrates a flowchart showing a procedure of a predetermined interval-interruption operation executed by the flash apparatus according to the first exemplary embodiment.

According to the first exemplary embodiment, in the interruption process in FIG. 5 and the charging process in FIG. 3, if the sum (INT_TTL) of the light emission amount, within the predetermined period of time (e.g., within five minutes), is the predetermined INT_TTL value or more, the boosting circuit 302 performs an intermittent operation every chosen time increment DT (e.g., 0.5 seconds). In other words, one method in accordance with the first exemplary embodiment is to limit the charging operation to aid in the reduction of a rise in temperature of the boosting circuit 302 and the battery 301. Moreover, due to delay in charging time, the continuous light emission can be limited and the temperature rise of the lens 330 (e.g., Fresnel lens) due to light emission of the discharge tube 307 can be reduced.

In the first exemplary embodiment, the relationship between the downtime and the operating time of the discharge is just one example of a method in accordance with the first exemplary embodiment; other combinations may also be employed. Further, although in the example of the first exemplary embodiment the lens apparatus 200 and the flash apparatus 300a are illustrated as replaceable, they may also be fixed (integrated) to the camera. In this case, the camera microcomputer 101 can performs the functions of the flash apparatus microcomputer 313a and the lens microcomputer 201. Further, in the example of the first exemplary embodiment, the camera main body 100 is illustrated to be that of a digital camera as an example; however, it may be also applied to a film camera or any other type of image capturing device as known by one of ordinary skill in the relevant art and equivalents.

In FIG. 1, the flash apparatus microcomputer 313a and the comparator 312 can be configured to function as a unit for setting a light emission amount, the integrating circuit 309 and the sensor 310 can be configured to function as a unit for detecting a light emission amount, the boosting circuit 302 can be configured to function as a charging unit, and the flash apparatus microcomputer 313a can be configured to function as a control unit. The flash apparatus microcomputer 313a can cause the boosting circuit 302 to perform an operation for limiting charge so as to reduce the temperature rise. The control unit can be configured to calculate the number of times the light emission is equal to or greater than a predetermined light emission amount, where the predetermined light emission amount is determined for emission within a predetermined period of time, and wherein the predetermined light emission amount is based on an output of the light emission amount obtaining unit.

A Second Exemplary Embodiment

Next, a camera system according to a second exemplary embodiment is described below. The second exemplary embodiment can have the same device components as the first exemplary embodiment (e.g., similar arrangement of circuits of the camera main body, the lens apparatus, and the flash apparatus). Therefore, description about the device components is omitted herein. A method according to the second exemplary embodiment can vary from the first exemplary embodiment and is described below.

A charge control of the flash apparatus 300a in the second exemplary embodiment is described below with reference to a flowchart illustrated in FIG. 6.

Figure 6:
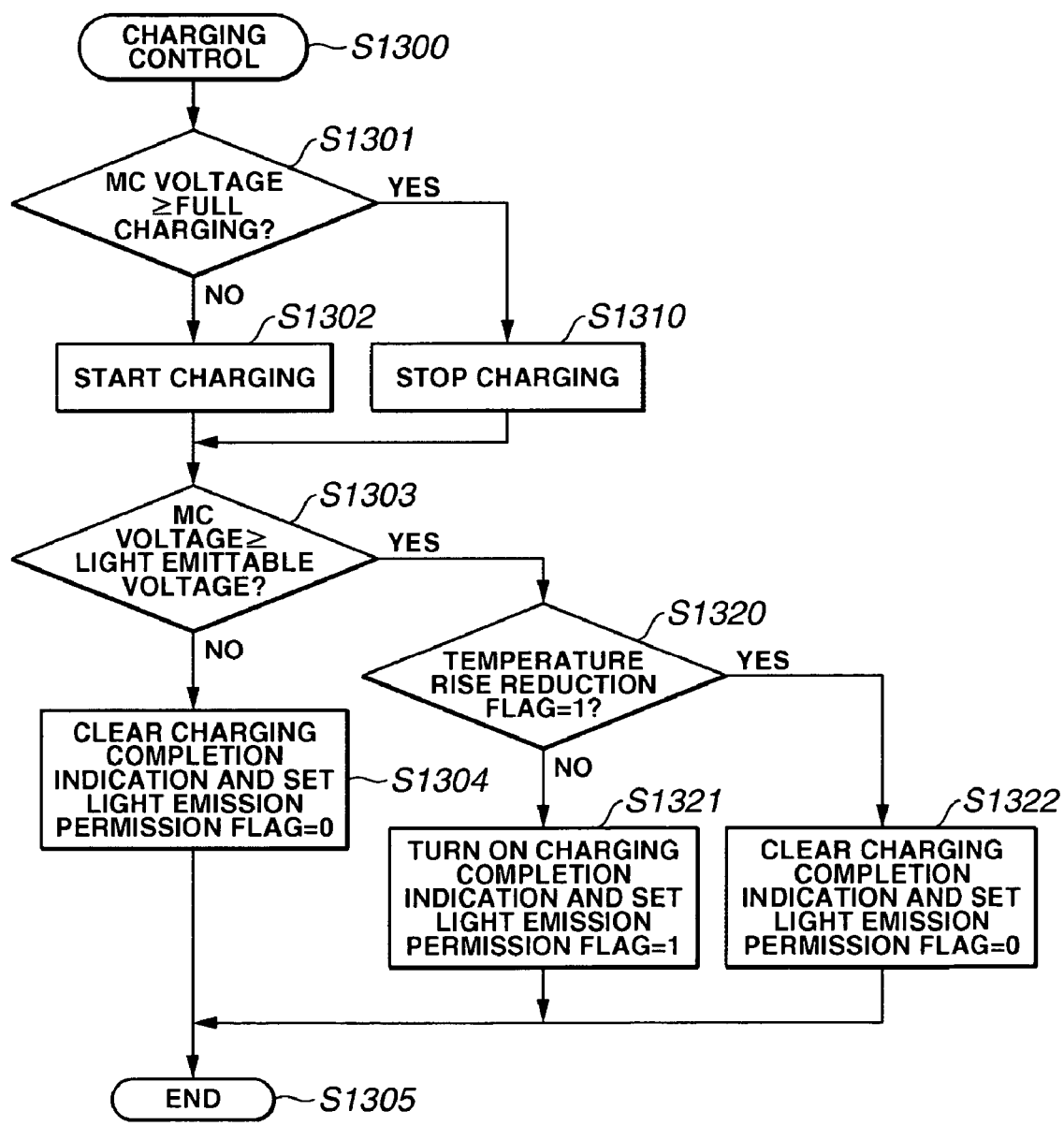
FIG. 6 illustrates a flowchart showing a procedure of a charge control operation executed by the flash apparatus according to a second exemplary embodiment.

The flash apparatus microcomputer 313a can start a charging process, step S1300, in FIG. 6, and then determine in step S1301 whether a charging voltage of the capacitor 303, which is analog-to-digital converted through the MCV_AD terminal, is at a full charging voltage or more. If it is at the full charging voltage or more, the program proceeds to a step S1310, otherwise it proceeds to a step S1302.

In step S1302, the flash apparatus microcomputer 313a can set the CHG_ON terminal to "H" so as to cause the boosting circuit 302 to operate and charge the capacitor 303, and then the program proceeds to step S1303. On the other hand, in step S1310, the flash apparatus microcomputer 313a can set the CHG_ON terminal to "L" so as to cause the boosting circuit 302 to stop or reduce the operation, and the program then proceeds to step S1303.

In step S1303, the flash apparatus microcomputer 313a determines whether the charging voltage of the capacitor 303, which is analog-to-digital converted through the INT_AD terminal, is at a light emittable voltage (e.g., <full charging voltage) or more. If it is the light emittable voltage or more, the program proceeds to a step S1320, or otherwise proceeds to step S1304.

When the program proceeds to step S1320, the flash apparatus microcomputer 313a can determine whether a temperature rise reducing flag, which is described later, is set to "1." If the flag is set to "1", the program proceeds to step S1322, otherwise it proceed to step S1321.

When the program proceeds to the step S1321, the display unit 321 turns on a charging completion indication, and then the flash apparatus microcomputer 313a can set a light emission permission flag to "1." This light emission permission flag can be transmitted to the camera microcomputer 101 through the interface 130 between the flash apparatus 300a and the camera main body 100, and then the camera microcomputer 101, which has received the flag, can transmit a light emission start signal at the time of shooting to the flash apparatus microcomputer 313a through the X terminal. In a case where the light emission permission flag is set to "1", the flash apparatus microcomputer 313a can start a light emission process upon receiving the light emission start signal for the flash apparatus 300a through the X terminal of the camera main body 100 or the input unit 320.

On the other hand, when the program proceeds to step S1322, the display unit 321 turns off the charging completion indication, and the flash apparatus microcomputer 313a can set the light emission permission flag to "0." This light emission permission flag is transmitted to the camera microcomputer 101 through the interface 130 between the flash apparatus 300a and the camera main body 100. The camera microcomputer 101, which has received the flag, does not transmit the light emission start signal to the flash apparatus microcomputer 313a (e.g., through the X terminal at the time of shooting). Further, in a case where the light emission permission flag is set to "0", the flash apparatus microcomputer 313a does not start the light emitting process even if the light emission start signal for the flash apparatus 300a is received through the X terminal of the camera main body 100 or the input unit 320.

In a case where the program proceeds from step S1303 to the step S1304, the display unit 321 can turn off the charging completion indication, and the flash apparatus microcomputer 313a can set the light emission permission flag to "0." Then the flash apparatus microcomputer 313a terminates this charging process in a step S1305.

The subroutine (method illustrated in FIG. 6) can be started until the process enters an electric source off mode or an energy saving mode. Further, this subroutine for the charging process may serve as an interruption process performed at regular intervals.

Next, a light emitting process of the flash apparatus 300a is described with reference to a flowchart illustrated in FIG. 7.

Figure 7:
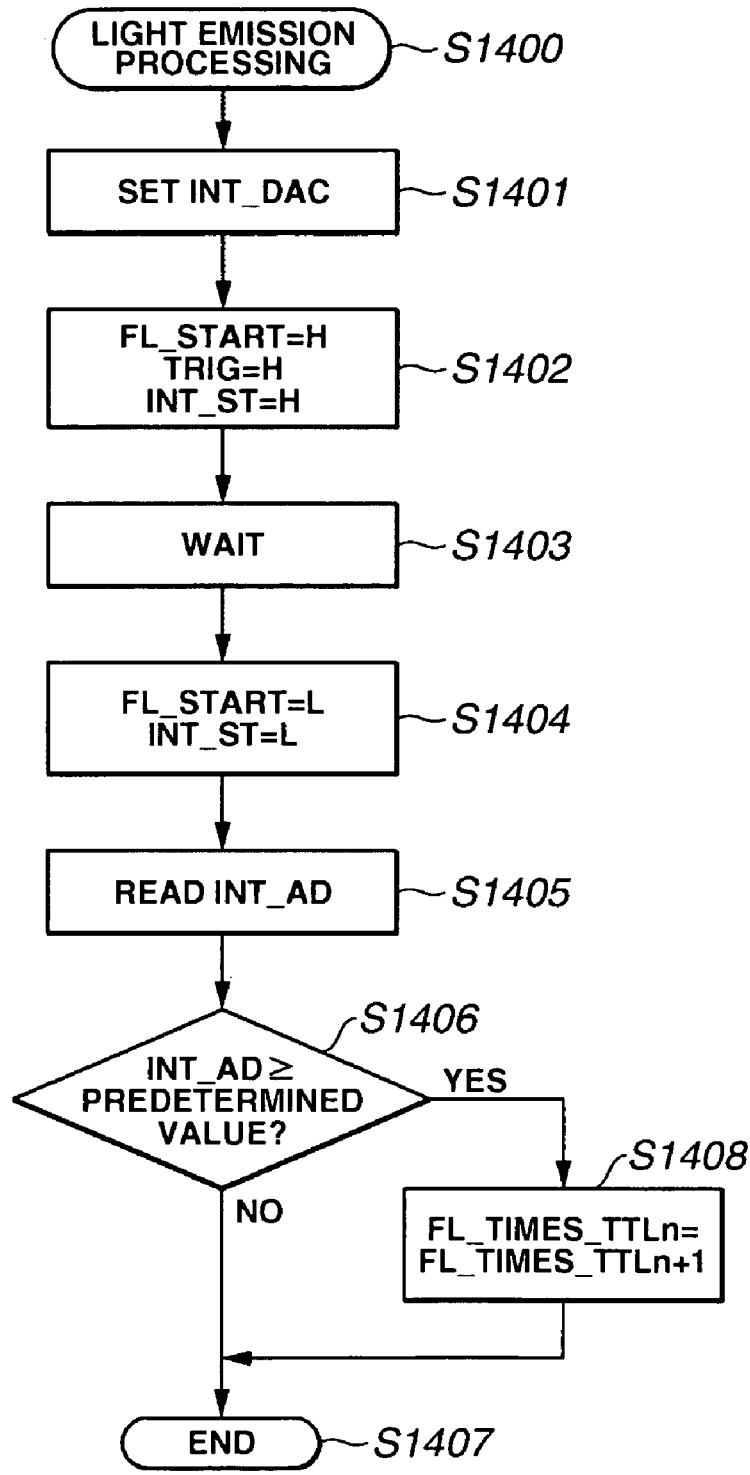
FIG. 7 illustrates a flowchart showing a procedure of a light emission operation executed by the flash apparatus according to the second exemplary embodiment.

In a case where the above-mentioned light emission permission flag is set to "1", the flash apparatus microcomputer 313a can start a light emission process, step S1400 in FIG. 7, upon receiving a light emission start signal for the flash apparatus 300a through the X terminal of the interface 130 with the camera main body 100 or the input unit 320. The flash apparatus microcomputer 313a can be configured to set the light emission amount, configured to start the light emission, configured to stop the light emission, and configured to detect the light emission amount in the steps S1401 to S1405. The processes of the steps S1401 to S1405 are identical with the operations of the steps S1201 to S1205 in FIG. 4 in the first exemplary embodiment, therefore, description about them is omitted herein.

In step S1406, the flash apparatus microcomputer 313a determines whether a value of the INT_AD terminal detected in the above-mentioned step S1405 is a predetermined INT_AD value or more which has an effect on the temperature rise of the respective components of the flash apparatus 300a. Then, if it is the predetermined INT_AD value or more, the program proceeds to step S1408, otherwise it proceed to a step S1407, where the flash apparatus microcomputer 313a terminates the light emission process:

When the program proceeds to step S1408, the flash apparatus microcomputer 313a can calculate the number of times of light emission FL_TIMES_TTLn (n is 0-4 according to a process which is described later) of a predetermined light emission amount or more within 1/(n+1) of a predetermined period of time, by the following equation (3):

$$FL\_TIMES\_TTLn = FL\_TIMES\_TTLn + 1 \quad (3)$$

Then, the program proceeds to a step S1407, where the flash apparatus microcomputer 313a terminates the light emission process.

Figure 8:
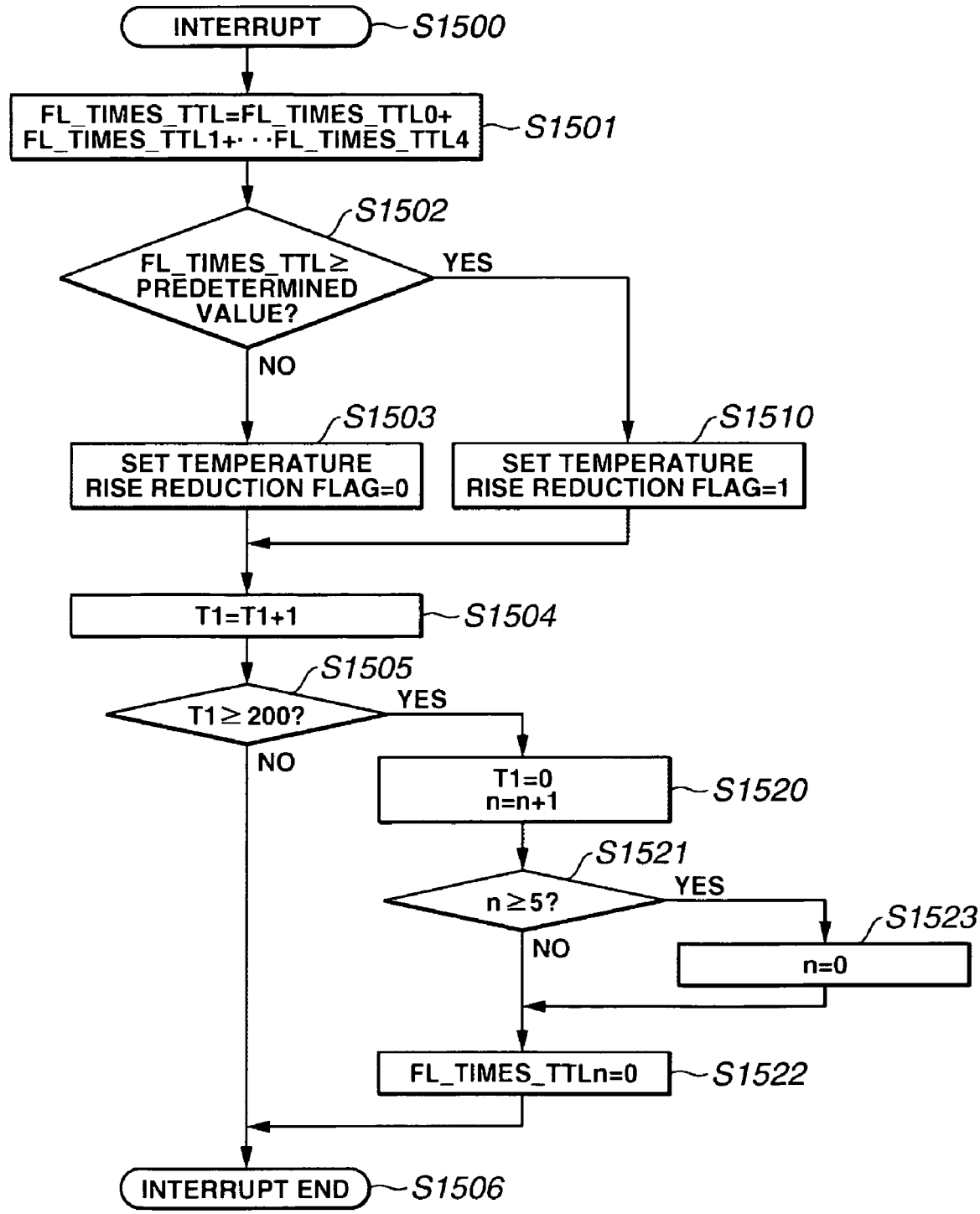
FIG. 8 illustrates a flowchart showing a procedure of a predetermined interval-interruption operation executed by the flash apparatus according to the second exemplary embodiment.

Next, an interruption routine for obtaining the number of times of light emission of a predetermined light emission amount or more, within a predetermined period of time (e.g., a 100 ms interval-interruption process), is described with reference to a flowchart illustrated in FIG. 8.

The flash apparatus microcomputer 313a can start an interruption process, step S1500. First, the number of times of light emission FL_TIMES_TTL of a predetermined light emission amount or more, within a predetermined period of time, can be obtained by using the following equation (4), in a step of S1501:

$$FL\_TIMES\_TTL = FL\_TIMES\_TTL0 + FL\_TIMES\_TTL1 + FL\_TIMES\_TTL2 + FL\_TIMES\_TTL3 + FL\_TIMES\_TTL4 \quad (4)$$

In step S1502, the flash apparatus microcomputer 313a determines whether the number of times of light emission (FL_TIMES_TTL) is greater than or equal to a predetermined value of a number of times. If it is, the program proceeds to a step S1510, otherwise proceeds to a step S1503.

The number of times of light emission (FL_TIMES_TTL) of a predetermined light emission amount or more, and the predetermined value of a number of times can be determined based on the relationship among calorific values (e.g., of the discharge tube 307 itself, the lens 330, due to the light emission of the discharge tube 307, calorific values of the boosting circuit 302, the battery 301) and other elements within the flash apparatus 300a due to the charging, and heat release values of the respective components of the flash apparatus 300a. The number of times of light emission FL_TIMES_TTL and the predetermined period of time are set to such that a member of the flash apparatus 300a does not thermally deform, or the photographer can touch the flash apparatus 300 with out suffering permanent injury. The values discussed above with respect to the second exemplary embodiment are examples only and thus, other values can be used within the scope of the second exemplary embodiment.

When the program proceeds to the step S1503, the temperature rise reducing flag is set to "0", and the program proceeds to step S1504. On the other hand, if the program proceeds to the step S1510, the temperature rise reducing flag is set to "1", and the program proceeds to step S1504.

In step S1504, the flash apparatus microcomputer 313a increments the timer T1 for measuring 1/(n+1) of the predetermined period of time (e.g., n=4). Then, in step S1505, the flash apparatus microcomputer 313a determines whether the value of the timer T1 is greater or equal to a predetermined T1 value (e.g., 200 or 20 seconds), and if it is, the program proceeds to step S1520, otherwise it proceeds to step S1506, where the interruption process is terminated.

When the program proceeds to step S1520, the flash apparatus microcomputer 313a can set the timer T1 to "0", and increments n, which is used for measuring the predetermined period of time. Then, in step S1521, the flash apparatus microcomputer 313a determines whethere n is greater than or equal to a predetermined "n" value (e.g., 5). If it is, the program proceeds to step S1523, where n is set to "0", and the program proceeds to step S1522. On the contrary, if it is less than the predetermined "n" value, the program proceeds to step S1522.

In step S1522, the flash apparatus microcomputer 313a can set the number of times of light emission (FL_TIMES_TTLn) of a predetermined light emission amount or more to "0" within 1/(n+1) of the predetermined period of time (e.g., n=4) and the program can proceed to step S1506, where this interruption process is terminated.

According to the above-mentioned second exemplary embodiment, when the number of times of light emission of a predetermined light emission amount or more within the predetermined period of time causes temperature of the respective components of the flash apparatus 300a to start rising, the flash apparatus microcomputer 313a can set the temperature rise reducing flag to "1" so as to set the light emission prohibition period of time, i.e., the light emission-possible signal is not issued during the predetermined period of time, accordingly the temperature rise can be reduced.

Although the lens apparatus 200 and the flash apparatus 300a are replaceable, these may also be fixed (integrated) to the camera main body 100. In this case, the camera microcomputer 101 can perform the functions of the flash apparatus microcomputer 313a and the lens microcomputer 201. Further, although the camera main body 100 is that of a digital video camera in the present embodiment, it may also be applied to a film camera or any other imaging capturing apparatus as known by one of ordinary skill in the relevant art, and equivalents.

Further, in the above-mentioned second exemplary embodiment, when the number of times of light emission of a predetermined light emission amount or more equals or exceeds the predetermined number of times within the predetermined period of time, the temperature rise reducing flag is set to "1" and the light emission prohibition time is set. However, as is the case with the above-mentioned first exemplary embodiment, a boosting operation of the boosting circuit 302 may be limited and the temperature rise may be reduced when the number of times of light emission equals or exceeds the predetermined number of a predetermined light emission amount or more within the predetermined period of time. Similarly, also in the case of the above-mentioned first exemplary embodiment, when the sum of the light emission amount (INT_TTL) within the predetermined period of time becomes the predetermined value or more, the temperature rise reducing flag may be set to "1" and the light emission prohibition period may be set, so as to reduce the temperature rise, as is the case with the second exemplary embodiment.

In the above-mentioned second exemplary embodiment, the flash apparatus microcomputer 313a can function as a control unit for calculating the number of times of light emission, of a predetermined light emission amount or more, within the predetermined period of time.

A Third Exemplary Embodiment

Figure 9:
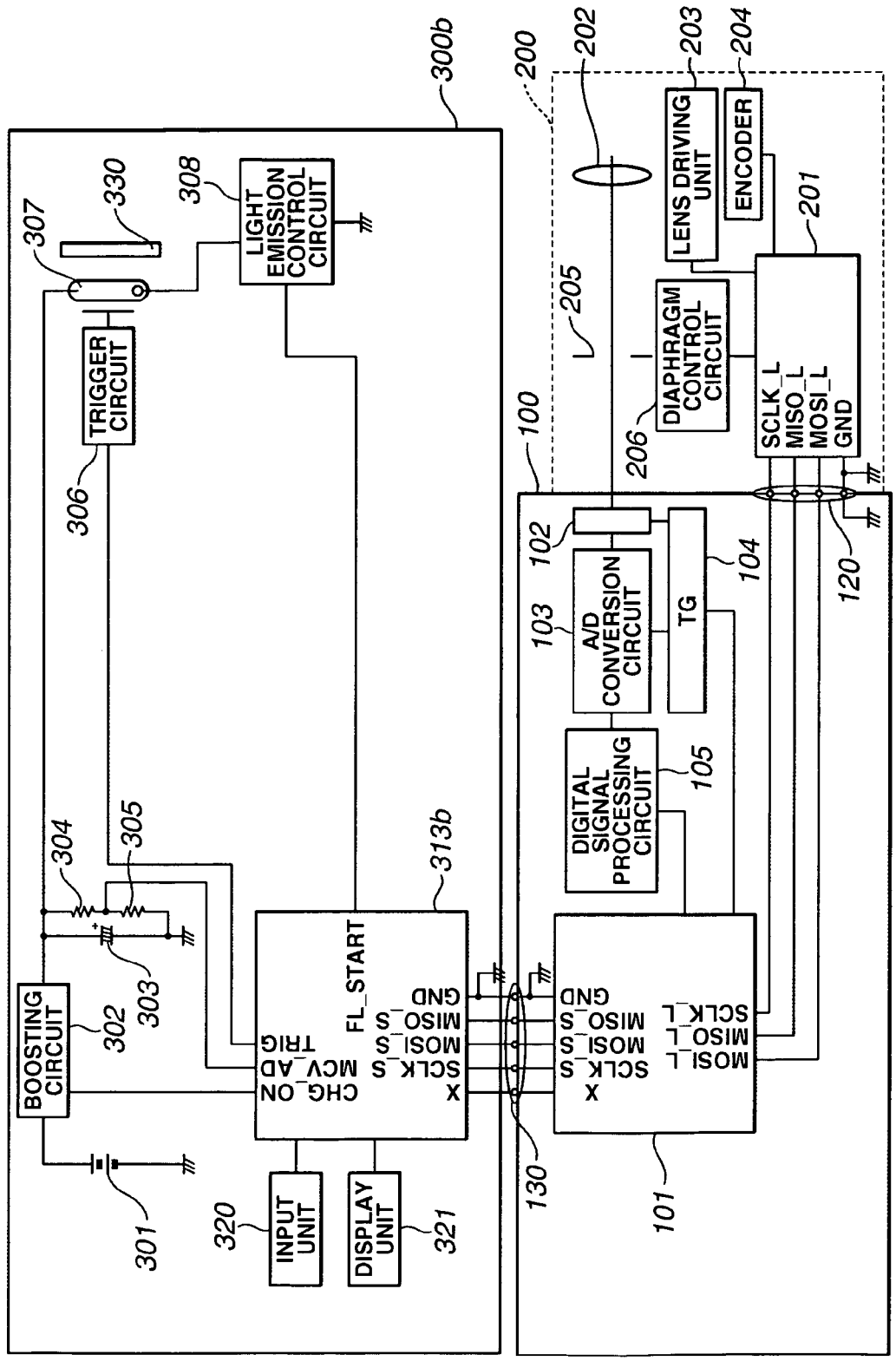
FIG. 9 illustrates a block diagram showing the arrangement of a circuit of a camera system according to a third exemplary embodiment.

Next, the arrangement of a circuit of a camera system according to a third exemplary embodiment is illustrated in FIG. 9. A camera main body 100 and a lens apparatus 200 can be identical in construction and operation with those of the first exemplary embodiment (FIG. 1), therefore, description about them is omitted herein. The third exemplary embodiment differs from the first exemplary embodiment in that the flash apparatus 300b does not have to include the integrate circuit 309, the sensor 310, the comparator 312, and the AND gate 311 as illustrated in FIG. 1 (300a) and further that the light emission control circuit 308 can be directly driven by a port of the flash apparatus microcomputer 313b. The light distribution varying unit 331 and the position detecting unit 333 can likewise be omitted, as illustrated in FIG. 9.

A light emitting process of the flash apparatus 300b in the third exemplary embodiment is described below with reference to a flowchart illustrated in FIG. 10.

Figure 10:
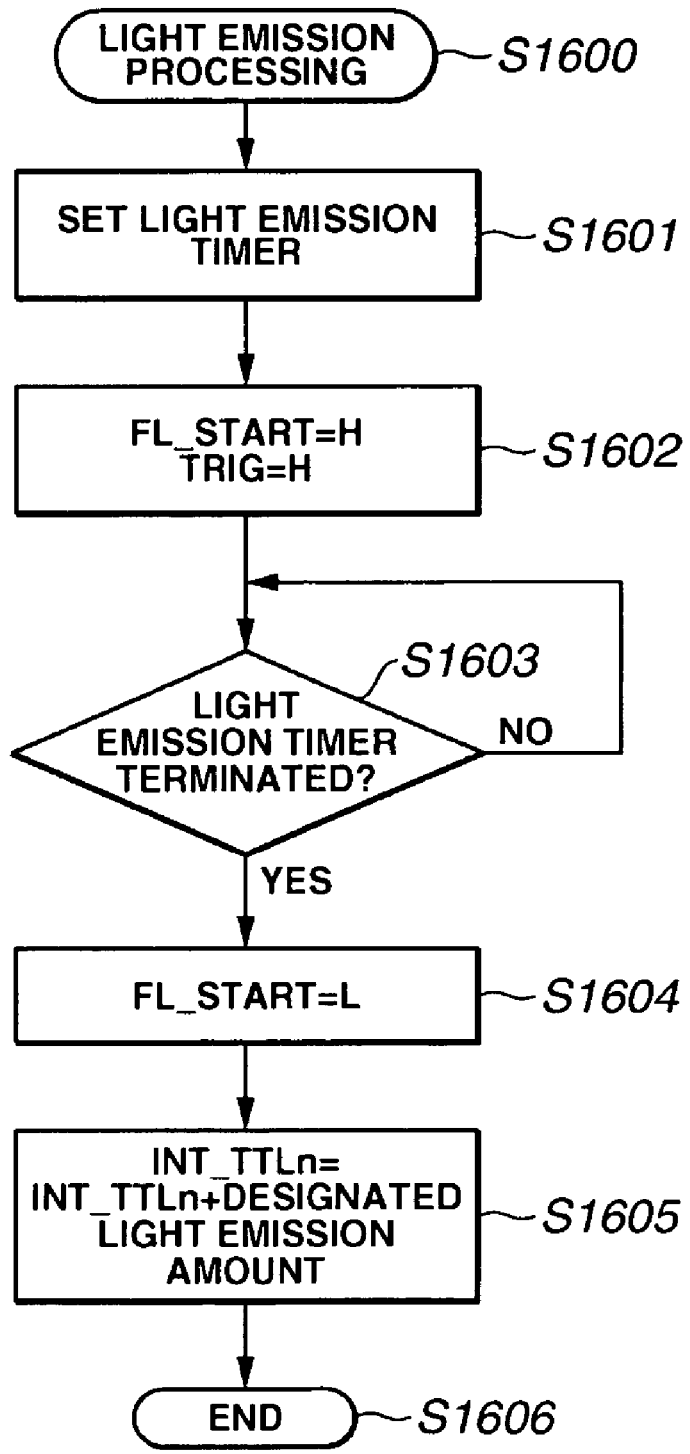
FIG. 10 illustrates a flowchart showing a procedure of a light emission operation executed by the flash apparatus according to the third exemplary embodiment.

The flash apparatus microcomputer 313b starts a light emission process, step S1600 in FIG. 10, upon receiving a light emission start signal for the flash apparatus 300b through the X terminal of the interface 130 with the camera main body 100 or the input unit 320. At first, in step S1601, the flash apparatus microcomputer 313b can set a light emission timer value to set a time to bring the light emission control circuit 308 into conduction, according to the light emission amount set by communicating with the camera microcomputer 101, or the light emission amount inputted from the input unit 320 of the flash apparatus 300b. This set value (i.e., the light emission timer value) can be obtained by various methods (e.g., based on a conversion table between the light emission amount and the light emission timer (set period of time) (e.g., as shown in FIG. 11), a function).

In step S1602, the flash apparatus microcomputer 313b outputs "H" to the FL_START terminal to bring the light emitting circuit 308 into a conductive condition, and outputs "H" to the TRIG terminal during a predetermined period of time so as to cause the discharge tube 307 to start emitting light. In step S1603, the flash apparatus microcomputer 313b waits in a ready mode until the light emission timer is terminated. Then in step S1604, the flash apparatus microcomputer 313b sets the FL_START terminal to "L" to shut off or reduce the discharge loop of the light emission control circuit and stop or reduce the discharge.

In step S1605, the flash apparatus microcomputer 313b calculates the sum of a light emission amount INT_TTLn (e.g., where n is 0-4 according to a process which is described later) within $1/(n+1)$ of a predetermined period of time by the following equation (5):

$$INT\_TTLn = INT\_TTLn + \text{indicated light emission amount} \quad (5)$$

The indicated light emission amount can be determined by a light emission amount which is set by communicating with the camera microcomputer 101 and used in setting a value of the light emission timer, or it is a value which is inputted from the input unit 320 of the flash apparatus 300b. Then, in step S1606, the flash apparatus microcomputer 313b can terminate the light emission process.

Other operations of the flash apparatus 300b can be identical with those of the first embodiment.

According to the third exemplary embodiment, through controlling the charging-start signal sent from the flash apparatus microcomputer 313b and limiting the boosting operation (charging operation) of the boosting circuit 302, the reduction of temperature rise can be performed. Accordingly, when the light emission amount, within the predetermined period of time, is the predetermined light emission amount or more, the discharge operation is limited, thereby the temperature rise of the flash apparatus 300b can be reduced.

According to the third exemplary embodiment, it is possible to reduce the temperature rise of the flash apparatus 300b, adopting a construction that can be more inexpensive than that of the first exemplary embodiment.

Moreover, as is the case with the first exemplary embodiment, the lens apparatus 200 and the flash apparatus 300b can be replaceable, however, these may also be fixed (integrated) to the camera main body. In this case, the camera microcomputer 101 can perform the functions of the flash apparatus microcomputer 307 and the lens microcomputer 201. Further, although the camera main body 100 can be that of a digital video camera as an example in this particular embodiment, it may also be applied to a film camera or other image pick-up apparatus as known by one of ordinary skill in the relevant art and equivalents.

A Fourth Exemplary Embodiment

Next, a camera system according to a fourth exemplary embodiment is described below. The fourth exemplary embodiment can be identical with the first exemplary embodiment with respect to the arrangement of a circuit of the camera main body, the lens apparatus, and the flash apparatus, therefore description about them is omitted herein.

The fourth exemplary embodiment differs from the first embodiment in that the flash apparatus 300b can cause, in charging operation, the boosting circuit 302 to continue to operate until a charging voltage of the capacitor 303, which is an analog-to-digital converted voltage directed through the MCV_AD terminal of the flash apparatus microcomputer 313b, equals or exceeds the full charging voltage.

Figure 12:
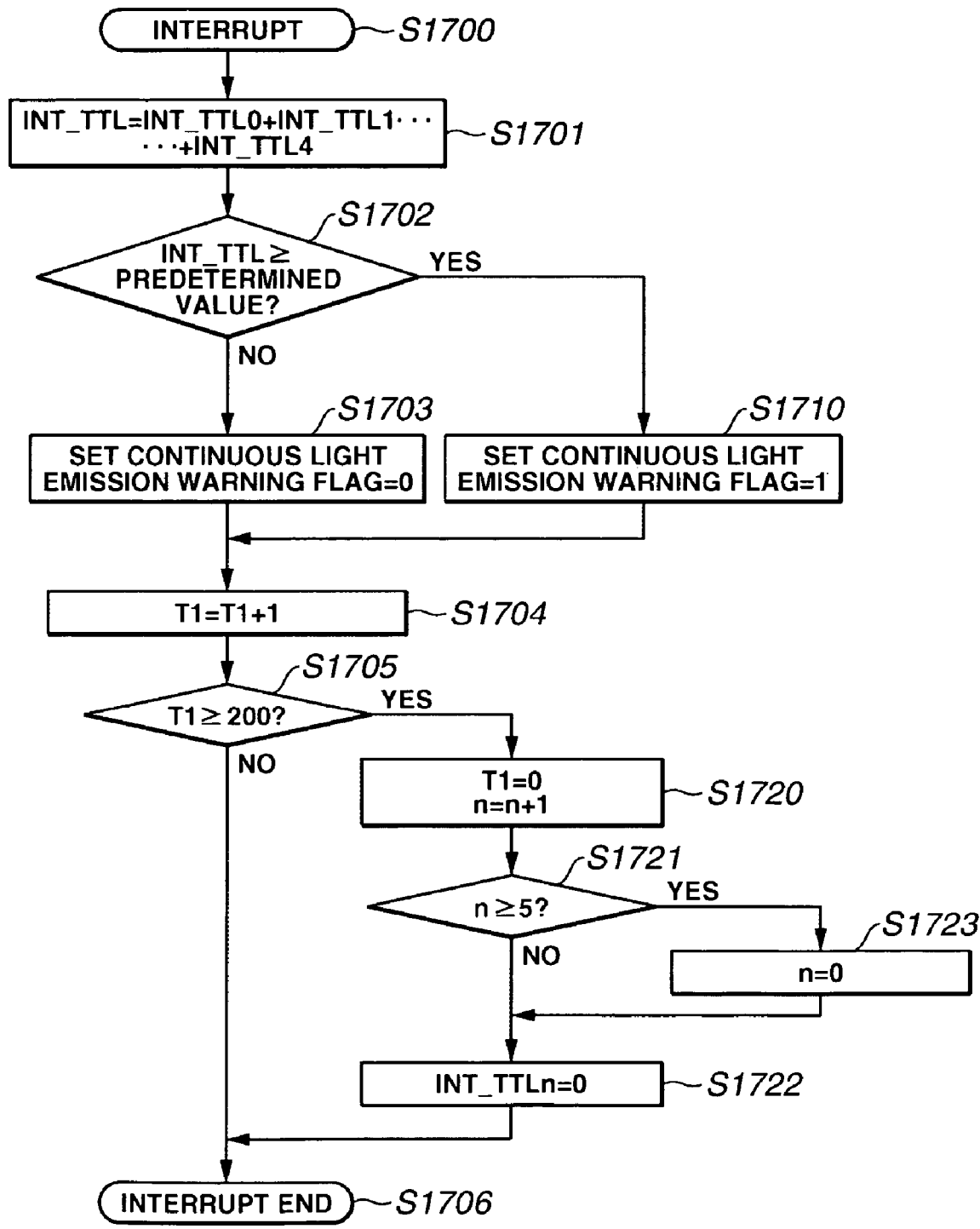
FIG. 12 illustrates a flowchart showing a procedure of a predetermined interval-interruption operation executed by a flash apparatus according to a fourth exemplary embodiment.

Next, an interruption routine for obtaining the sum of light emission amount, within a predetermined period of time (e.g., a 100 ms interval-interruption process) is described with reference to a flowchart illustrated in FIG. 12.

The flash apparatus microcomputer 313b can start an interruption process in step S1700, and at first, can obtain the sum of light emission amount INT_TTL within the predetermined period of time, for example by using the following equation (6) in a step of S1701:

$$INT\_TTL = INT\_TTL0 + INT\_TTL1 + INT\_TTL2 + INT\_TTL3 + INT\_TTL4 \quad (6)$$

In step S1702, the flash apparatus microcomputer 313b can determine whether the sum of light emission amount (INT_TTL) is the predetermined INT_TLL value or more. If it is the predetermined INT_TLL value or more, the program proceeds to step S1710, otherwise it proceeds to step S1703.

The predetermined sum of light emission amount and the predetermined period of time can be determined based on the relationship among calorific values (e.g., of the discharge tube 307 itself and the lens 330 due to the light emission of the discharge tube 307, calorific values of the boosting circuit 302, the battery 301), within the flash apparatus 300b due to the charging, and heat release values of the respective components of the flash apparatus 300b. The predetermined sum of the light emission amount and the predetermined period of time can be set to such that a member of the flash apparatus 300b does not significantly thermally deform, or the photographer can touch the flash apparatus 300 without suffering permanent injury. The values described herein in the fourth exemplary embodiment illustrate just one example only, many values may be within the scope of exemplary embodiments.

When the program proceeds from step S1702 to step S1703, a continuous light emission warning flag is set to "0." On the other hand, when the program proceeds to the step S1710, the continuous light emission warning flag is set to "1." The continuous light emission warning flag can be communicated to the camera microcomputer 101 through the interface 130 with the camera main body.

In the step S1704, the flash apparatus microcomputer 313 increments the timer T1 for measuring $1/(n+1)$ of the predetermined period of time. Then, in step S1704, the flash apparatus microcomputer 313 determines whether the value of the timer T1 is 200 or more (20 seconds), and, if it is 200 or more (20 seconds), the program proceeds to a step S1720, otherwise proceeds to a step S1706, where this interruption process is terminated.

When the program proceeds to the step S1720, the flash apparatus microcomputer 313b can set the timer T1 to "0", and then increments n, which is used for measuring the predetermined period of time. In step S1721, the flash apparatus microcomputer 313b can determine whether n is greater than or equal to a predetermined "n" value (e.g., 5).

If n is greater than or equal to the predetermined "n" value, the program proceeds to step S1723, otherwise it proceeds to a step S1722.

If the program proceeds to step S1723, the flash apparatus microcomputer 313b sets n to "0", and proceeds to step S1722. In the step S1722, the flash apparatus microcomputer 313b sets the sum of light emission amount INT_TTLn within 1/(n+1) of the predetermined period of time to "0", and the program proceeds to a step S1706, where the interruption process is terminated.

Upon receiving the continuous light emission warning flag of "1" from the flash apparatus microcomputer 313b, the camera microcomputer 101 can increase a gain (sensitivity) of a light emission circuit of the image capture element 102 via a timing generator (TG) 104.

According to the above-mentioned fourth exemplary embodiment, upon receiving the continuous light emission warning flag of "1" from the flash apparatus microcomputer 313b, the camera microcomputer 101 can increase the gain (sensitivity) of the light emitting circuit of the image capture element 102; therefore, it is possible to obtain a suitable exposure even if the light emission amount of the flash apparatus 300b is less than before the gain is increased, which can reduce the temperature rise of the discharge tube 307 and the boosting circuit 302 in the flash apparatus 300b. The temperature rise reduction carried out by the camera microcomputer 101 upon receiving the continuous light emission warning flag of "1" may be performed not only by increasing a gain of the image capture element 102 but also by prohibiting the continuous light emission.

Moreover, although the lens apparatus 200 and the flash apparatus 300b are replaceable in the present exemplary embodiment as is the case with the first through third exemplary embodiments, these apparatuses may also be fixed (integrated) to the camera main body 100. In this case, the camera microcomputer 101 can performs the function of the flash apparatus microcomputer 307 and the lens microcomputer 201. Further, although the camera main body 100 is that of a digital camera as an example in this embodiment, it may also be applied to a film camera, other image capturing apparatus as known by one of ordinary skill in the relevant arts, and equivalents.

A Fifth Exemplary Embodiment

Next, a camera system according to a fifth exemplary embodiment is described below. The fifth exemplary embodiment can be identical with the first exemplary embodiment with respect to the arrangement of a circuit of the camera main body, the lens apparatus, and the flash apparatus. Therefore, description about them is omitted herein. The fifth exemplary embodiment is described below.

Figure 13:
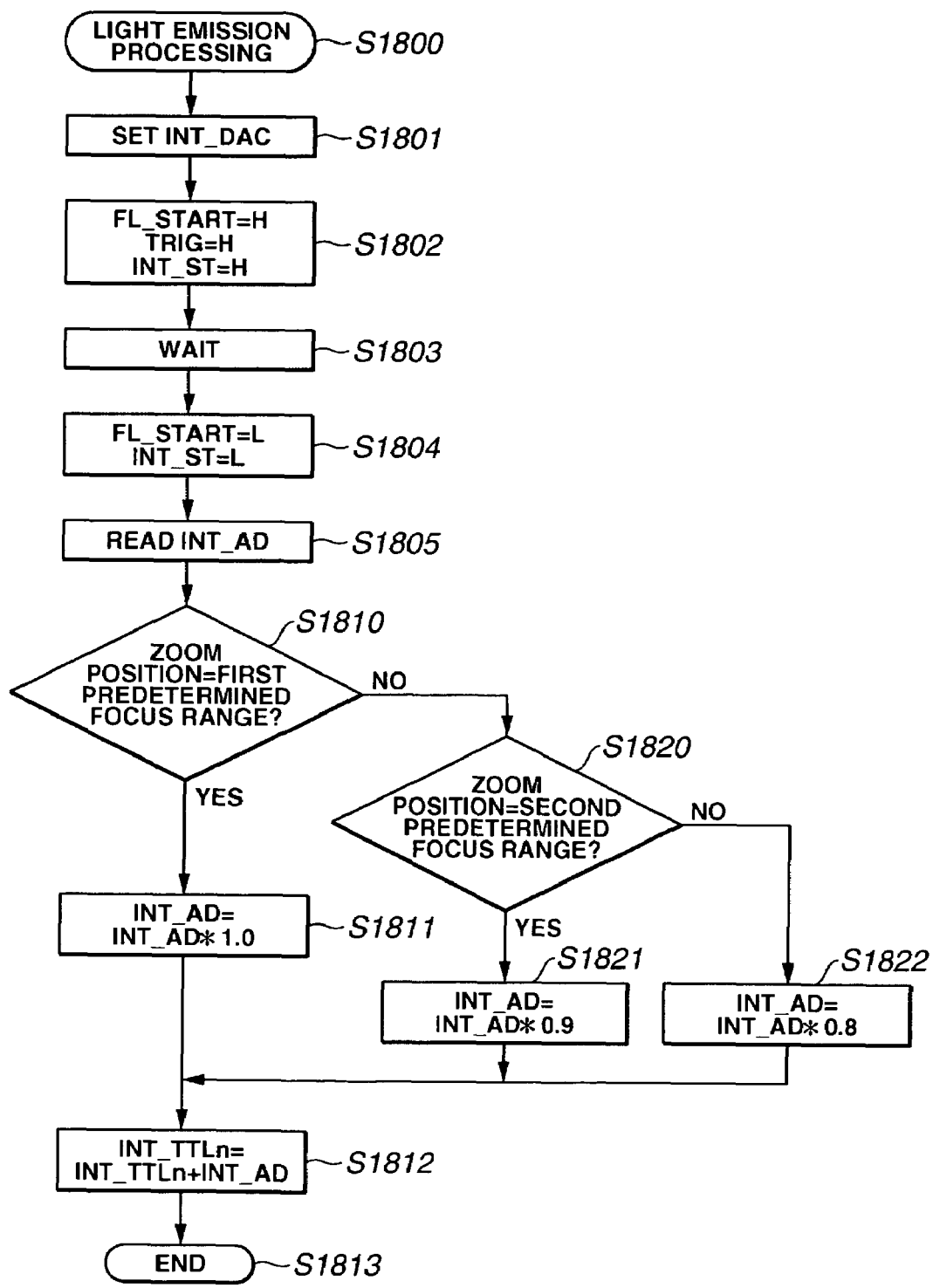
FIG. 13 illustrates a flowchart showing a procedure of a light emission operation executed by a flash apparatus according to a fifth exemplary embodiment.

A light emission operation of the flash apparatus 300b in the fifth exemplary embodiment described with reference to a flowchart illustrated in FIG. 13.

When a light emission start signal for the flash apparatus 300b is received through the X terminal from the camera main body 100 or the input unit 320, the flash apparatus microcomputer 313b starts a light emission process from a step S1800. In steps S1801 to S1805, the flash apparatus microcomputer 313b performs processes of setting the INT_DAC terminal, starting the light emission, stopping the light emission, and reading from the INT_AD terminal. The processes of the steps S1801 to S1805 are similar with the operations of the steps S1201 to S1205 of FIG. 4 in the first exemplary embodiment, therefore, description about them is omitted herein.

In step S1810, the flash apparatus microcomputer 313b determines whether a radiating range of the flash apparatus 300b (positional relationship between the discharge tube 307 and the lens 330) corresponds in position to a first predetermined focus distance range (e.g., 24 to 28 mm-focus distance in a 135film equivalent). If so, the program proceeds to step S1811, where the INT_AD value is multiplied by a weight of 1.0 by the equation (7) described below:

$$INT\_AD = INT\_AD * 1.0 \quad (7)$$

Then, the program proceeds to step S1812.

Further, in step S1810, if the flash apparatus microcomputer 313b determines that the radiating range of the flash apparatus 300 does not correspond in position to the first predetermined focus distance range (e.g., 24 to 28 mm-focus distance in a 135film equivalent), the program proceeds to step S1820. In step S1820, the flag apparatus microcomputer 313b determines whether the radiating range of the flash apparatus 300 corresponds in position to a second predetermined focus distance range (e.g., 35 to 50 mm-focus distance in a 135film equivalent). If so, the program proceeds to step S1821, where the INT_AD value can be multiplied by a weight, for example by 0.9, as indicated by equation (10) described below.

$$INT\_AD = INT\_AD * 0.9 \quad (10)$$

Then, the program proceeds to step S1812.

In step S1820, if the flash apparatus microcomputer 313b determines that the radiating range of the flash apparatus 300b does not correspond in position to the second predetermined focus distance range, the program proceeds to step S1822. In step S1822, the INT_AD value is multiplied by a weight, for example by 0.8, indicated by equation (11) described below.

$$INT\_AD = INT\_AD * 0.8 \quad (11)$$

Then, the program proceeds to step S1812.

In step S1812, the flash apparatus microcomputer 313b can calculate the sum INT_TTLn (n is 0-4 according to a process described later) of a light emission amount within 1/(n+1) of the predetermined period of time by equation (12) described below:

$$INT\_TTLn = INT\_TTLn + INT\_AD \quad (12)$$

Then, the program proceeds to a step S1813, where the flash apparatus microcomputer 313b terminates or reduces the light emission process.

As a value of the light emission amount, the analog-to-digital converted value detected in the step s1805 may be employed as it is, or a value which is stored in a storage unit (not shown) and is based on an amount of light emitted by the flash apparatus in full charging and full light emission may be employed. Further, although the light emission amount can be calculated by using a value integrated by the integrating circuit 309 in the present exemplary embodiment, it may also be calculated by using a light emission amount set by communicating with the camera microcomputer 101, or a light emission amount inputted from the input unit 320 of the flash apparatus.

Also in the fifth exemplary embodiment, the relationship between the radiating position in the steps S1810 and S1820 and the weighting in the steps S1811, S1821, and S1822 are just examples, other exemplary embodiments can set predetermined, and second predetermined, focus distance ranges according to an actual flash apparatus.

According to the fifth exemplary embodiment, the detected light emission amount can be weighted according to the positional relationship between the discharge tube 307 and the lens 330 (e.g., corresponding to the changed radiation range). In other words, the weight of the light emission amount can be increased when the discharge tube 307 and the lens 330 (e.g., Fresnel) are positioned close to each other, and the lens 330 generates heat. On the other hand the weight of the light emission amount is decreased when the discharge tube 307 and the lens 330 are away from each other, and the lens 330 generates little heat. Therefore, it is possible to detect the temperature rise more accurately and minutely in an approximate manner without actually using the temperature detecting unit which pushes up the cost and can require an installation space. By controlling the temperature rise reduction based on the detected results, the temperature rise can be reduced while the continuous light emission of the flash apparatus 300b can be performed more times.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-238817 filed Aug. 18, 2004, which is hereby incorporated by reference herein in its entirety.

What is claimed is:

1. A flash apparatus comprising:
a charging unit configured to boost a voltage of an electric source, wherein the boost in voltage of the electric source charges a capacitor which is used for supplying a light emission energy to a discharge tube;
a light emission amount obtaining unit configured to obtain a light emission amount; and
a control unit configured to calculate the sum of the light emission amount within a predetermined period of time based on an output of the light emission amount obtaining unit.

2. The flash apparatus according to claim 1, wherein the control unit is configured to perform a process of reducing the temperature rise of a component caused by heat generated due to continuous flash light emission.

3. The flash apparatus according to claim 1, further comprising a radiating range changing unit configured to change a radiating range of the discharge tube for performing a flash light emission, wherein the control unit places weighting on the light emission amount obtained by the light emission amount obtaining unit according to the changed radiating range, and calculates the sum of the light emission amount within a predetermined period of time based on the weighted light emission amount.

4. The flash apparatus according to claim 2, wherein the control unit limits a charging operation of the charging unit.

5. The flash apparatus according to claim 2, wherein the control unit reduces the flash light emission during a predetermined period of time.

6. The flash apparatus according to claim 2, wherein the control unit outputs a warning signal against continuous light emission to a camera, which communicates with the flash apparatus.

7. The flash apparatus according to claim 2, wherein the control unit outputs, to a camera, which communicates with the flash apparatus, a signal indicating to the camera to increase a gain of an image capture unit of the camera.

8. A flash apparatus comprising:
a charging unit configured to boost a voltage of an electric source, wherein the boost in voltage of the electric source charges a capacitor which is used for supplying a light emission energy to a discharge tube;
a light emission amount obtaining unit configured to obtain a light emission amount; and
a control unit configured to calculate the number of times the light emission is equal to or greater than or equal to a predetermined light emission amount, within a predetermined period of time, and wherein the predetermined light emission amount is based on an output of the light emission amount obtaining unit.

9. The flash apparatus according to claim 8, wherein the control unit reduces the temperature rise of a component, due to heat generated by continuous flash light emission when the light emission amount is greater than or equal to the predetermined light emission amount.

10. The flash apparatus according to claim 8, further comprising a radiating range changing unit configured to change a radiating range of the discharge tube for performing a flash light emission, wherein the control unit places weighting on the light emission amount obtained by the light emission amount obtaining unit according to the changed radiating range, determines whether the weighted light emission amount is greater than or equal to the predetermined light emission amount, and calculates the number of times the weighted light emission is greater than or equal to the predetermined light emission amount.

11. The flash apparatus according to claim 9, wherein the control unit limits a charging operation of the charging unit.

12. The flash apparatus according to claim 9, wherein the control unit reduces the flash light emission during a predetermined period of time.

13. The flash apparatus according to claim 9, wherein the control unit outputs a warning signal against continuous light emission to a camera, which communicates with the flash apparatus.

14. The flash apparatus according to claim 9, wherein the control unit outputs to a camera, which communicates with the flash apparatus, a signal indicating to the camera to increase a gain of an image capture unit of the camera.

15. An image capture apparatus having a flash apparatus comprising:
a charging unit configured to boost a voltage of an electric source, wherein the voltage boost of the electric source charges a capacitor for supplying a light emission energy to a discharge tube;
a light emission amount obtaining unit configured to obtain a light emission amount; and
a control unit configured to calculate the sum of the light emission amount within a predetermined period of time based on an output of the light emission amount obtaining unit.

16. The image capture apparatus according to claim 15, wherein the control unit reduces the temperature rise of a component due to heat generated by continuous flash light emission, when the light emission amount is greater than or equal to a predetermined value.

17. The image capture apparatus according to claim 15, further comprising a radiating range-changing unit configured to change a radiating range of the discharge tube for performing a flash light emission, wherein the control unit places weighting on the light emission amount obtained by the light emission amount obtaining unit according to the changed radiating range, and calculates the sum of the light emission amount within a predetermined period of time based on the weighted light emission amount.

18. The image capture apparatus according to claim 16, wherein the control unit increases a gain of an output signal of an image capture element on to which an object is focused.

19. An image capture apparatus comprising:
a charging unit configured to boost a voltage of an electric source, wherein the boost in voltage of the electric source charges a capacitor for supplying a light emission energy to a discharge tube;
a light emission amount obtaining unit configured to obtain a light emission amount; and
a control unit configured to calculate the number of times light emission is greater than or equal to a predetermined light emission amount, within a predetermined period of time, based on an output of the light emission amount obtaining unit.

20. The flash apparatus according to claim 19, wherein the control unit reduces the temperature rise of a component, due to heat generated by continuous flash light emission, when the light emission is greater than or equal to the predetermined light emission amount.

21. The flash apparatus according to claim 19, further comprising a radiating range changing unit configured to change a radiating range of the discharge tube for performing a flash light emission, wherein the control unit places weighting on the light emission amount obtained by the light emission amount obtaining unit according to the changed radiating range, determines whether the weighted light emission amount is greater than or equal to the predetermined light emission amount, and calculates the number of times the light emission is greater than or equal to the predetermined light emission amount within the predetermined period of time.

22. The image capture apparatus according to claim 20, wherein the control unit increases a gain of an output signal of an image capture element on which an object is focused.

23. A method of controlling a flash apparatus having a charging unit configured to boost a voltage of an electric source in order to charge a capacitor for supplying a light emission energy to a discharge tube, comprising the steps of:
obtaining a light emission amount;
calculating the sum of the light emission amount within a predetermined period of time based on the obtained light emission amount; and
reducing the temperature rise of a component due to heat generated by continuous flash light emission, where the sum of the light emission amount reaches a predetermined value.

24. A method of controlling a flash apparatus having a charging unit configured to boost a voltage of an electric source in order to charge a capacitor for supplying a light emission energy to a discharge tube, comprising the steps of:
obtaining a light emission amount;
calculating the number of times light emission is greater than or equal to a predetermined light emission amount within a predetermined period of time, based on the obtained light emission amount; and
reducing the temperature rise of a component due to heat generated by continuous flash light emission, where the number of times of light emission calculated is greater than or equal to a predetermined number of times.

* * * * *